United States Patent
Wang

(10) Patent No.: US 7,241,133 B2
(45) Date of Patent: Jul. 10, 2007

(54) ADJUSTMENT DEVICE FOR A MOVABLE WALL OF AN INJECTION MOLDING MACHINE

(75) Inventor: Jui-Hsiang Wang, Yung Kang (TW)

(73) Assignee: Hwa Chin Machinery Factory Co., Ltd., Tainan Hsien (TW)

( * ) Notice: Subject to any disclaimer, the term of this patent is extended or adjusted under 35 U.S.C. 154(b) by 203 days.

(21) Appl. No.: 11/206,047

(22) Filed: Aug. 18, 2005

(65) Prior Publication Data
US 2007/0042076 A1 Feb. 22, 2007

(51) Int. Cl.
*B29C 45/84* (2006.01)

(52) U.S. Cl. ........................ 425/575; 425/168

(58) Field of Classification Search ........... 425/575, 425/589, 595, 168
See application file for complete search history.

(56) References Cited

U.S. PATENT DOCUMENTS

| | | | | |
|---|---|---|---|---|
| 3,936,259 A | * | 2/1976 | Hofer et al. | 425/574 |
| 4,874,309 A | * | 10/1989 | Kushibe et al. | 425/589 |
| 5,328,346 A | * | 7/1994 | Kodric | 425/107 |
| 5,338,171 A | * | 8/1994 | Hayakawa et al. | 425/138 |
| 5,772,420 A | * | 6/1998 | Holmes | 425/588 |
| 6,290,482 B1 | * | 9/2001 | Glaesener et al. | 425/168 |
| 6,379,145 B1 | * | 4/2002 | Urbanek | 425/589 |
| 6,805,827 B2 | * | 10/2004 | Kami et al. | 264/328.1 |
| 2003/0141632 A1 | * | 7/2003 | Fuller et al. | 264/328.1 |
| 2003/0228391 A1 | * | 12/2003 | Meschia et al. | 425/589 |
| 2005/0025856 A1 | * | 2/2005 | Nishino | 425/595 |
| 2006/0251758 A1 | * | 11/2006 | Kang et al. | 425/567 |

* cited by examiner

*Primary Examiner*—Duane Smith
*Assistant Examiner*—Emmanuel S. Luk
(74) *Attorney, Agent, or Firm*—Rosenberg, Klein & Lee

(57) ABSTRACT

A device includes a sliding base, supporting posts, and hydraulic oil; the sliding base has cavities, an oil passage communicating with the cavities, and oil seals secured around respective cavities, and it is movable along a guide rail secured on a bed of an injection molding machine; the supporting posts each have a room on a lower end, and are inserted in respective cavities such that the rooms communicate with the cavities; the posts touch and prop a movable wall of the molding machine at upper ends, which wall is supported by and movable along guide rods, and has bushings around the guide rods; the hydraulic oil is injected into the sliding base and the posts until the axes of each bushing and the corresponding guide rod are aligned; thus, alignment of the axes of each bushing and the corresponding guide rod will be maintained when the movable wall is moving.

3 Claims, 10 Drawing Sheets

ADJUSTMENT DEVICE FOR A MOVABLE WALL OF AN INJECTION MOLDING MACHINE

BACKGROUND OF THE INVENTION

1. Field of the invention

The present invention relates to an adjustment device for a movable wall of an injection molding machine, more particularly one, which will help lengthen the service life of the injection molding machine.

2. Brief Description of the Prior Art

Referring to FIG. 1, a conventional plastic injection molding machine 1 includes a bed 11, a heating device 12, a mold 13, a movable wall 14, a fixed wall 15, a rear seat 16, a mold closing device 17, and four guide rods 18. The guide rods 18 are secured to the rear seat 16 at first ends thereof, and securely joined to the fixed wall 15 at the other ends thereof. The movable wall 14 is supported on and movable along the guide rods 18. The mold 13 includes male female halves, which are secured on the movable wall 14, and the fixed wall 15 respectively. The heating device 12 is positioned on the bed 11 for melting plastic materials, and injecting the materials into the mold 13. The mold closing device 17 is connected to both the rear seat 16 and the movable wall 14 for moving the movable wall 14 along the guide rods 18, and it can be equipped with oil hydraulic cylinders or toggles.

Furthermore, the movable wall 14 is equipped with bushings 141 around the guide rods 18. Because the intermediate portions of the guide rods 18, along which the movable wall 14 will move, aren't propped with other articles, and the mold closing device 17, the movable wall 14, and the male (female) halves of the mold 13 together are very heavy in weight, axes of the guide rods 18 and bushings 141 of the movable wall 14, through which the guide rods 18 are passed, will change their direction, causing the orientation of the guide rods 18 in relation to the bushings 141 to undesirably change as shown in FIG. 2. Consequently, the bushings 141 will touch the guide rods 18 in an abnormal way, and wear down too rapidly.

Referring to FIG. 3, to overcome the above problem, adjustment devices 19 are connected to two ends of a bottom of the movable wall 14. The adjustment devices 19 are movable along guide rails 111 secured on the upper side of the bed 11, and each includes a fixed sloping block 191, a movable sloping block 192, and a bolt 193; the movable sloping block 192 is on the guide rails 111 with a sloping side thereof facing up while the fixed sloping block 191 has a sloping bottom touching the upper sloping side of the movable sloping block 192; the bolt 193 is connected to both the movable sloping block 192 and the fixed sloping block 191, used for changing position of the movable sloping block 192 relative to the fixed sloping block 191. Therefore, the two ends of the movable wall 14 can be adjusted in height, and the movable wall 14 will be propped up by means of the adjustment devices 19, maintaining the original direction of the axes of the guide rods 18 and the bushings 141 of the movable wall 14, and preventing the bushings 141 from touching the guide rods 18 in an abnormal manner to wear down too rapidly. Consequently, the bushings 141 have longer service life.

However, the bushings 141 will be prevented from touching the guide rods 18 to wear down in an abnormal manner only when the movable wall 14 is still. When the movable wall 14 is moving along the guide rods 18, it will still move up and down because the guide rails 111 aren't one hundred percent smooth owing to limitation on precision of manufacturing. Consequently, the axes of the guide rods 18 and the bushings 141 of the movable wall 14 will change their direction, and the bushings 141 will touch the guide rods 18 in an abnormal manner, and wear down too rapidly.

SUMMARY OF THE INVENTION

It is a main object of the invention to provide an improvement on adjustment device for a movable wall of an injection molding machine to overcome the above-mentioned problem. The adjustment device includes a sliding base, supporting posts, and hydraulic oil. The sliding base has cavities, an oil passage communicating with the cavities, and oil seals secured around respective ones of the cavities, and it is movable along a guide rail secured on a bed of an injection molding machine. The supporting posts each have a holding room on a lower end, and they are inserted in the cavities of the sliding base such that the holding rooms communicate with the cavities. The supporting posts touch and prop a movable wall of the molding machine at upper ends, which wall is supported with and movable along guide rods, and has bushings around the guide rods. The hydraulic oil is injected into the sliding base and the supporting posts through the oil passage until the axes of each bushing and the corresponding guide rod are aligned with each other, with upper end portions of the holding rooms of the supporting posts containing air therein. Therefore, alignment of the axes of each bushing and the corresponding guide rod will be maintained when the movable wall is moving as well as when the movable wall is still.

BRIEF DESCRIPTION OF THE DRAWINGS

The present invention will be better understood by referring to the accompanying drawings, wherein.

DETAILED DESCRIPTION OF THE PREFERRED EMBODIMENTS

Figure 1:
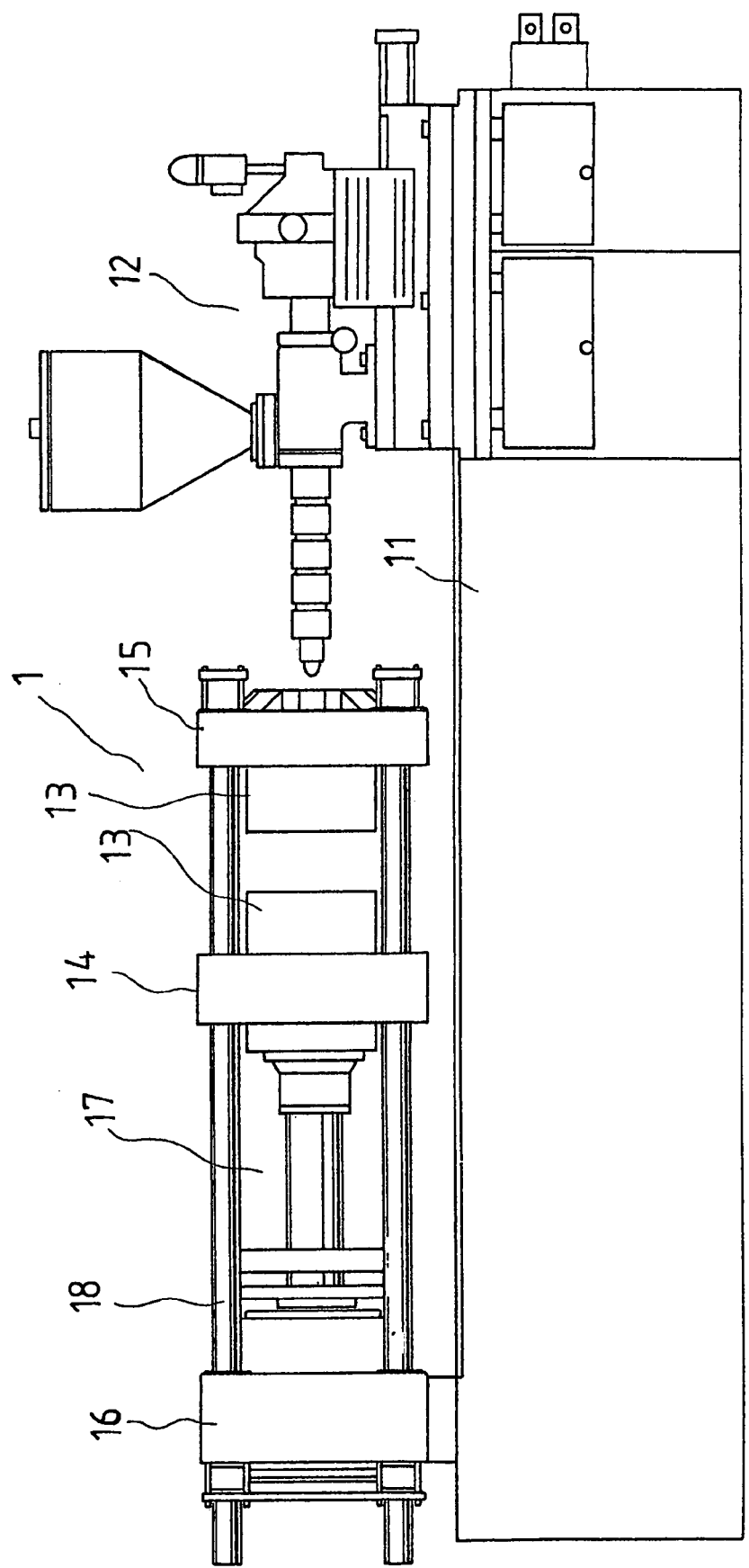
FIG. 1 is a front view of the conventional molding machine.
Figure 2:
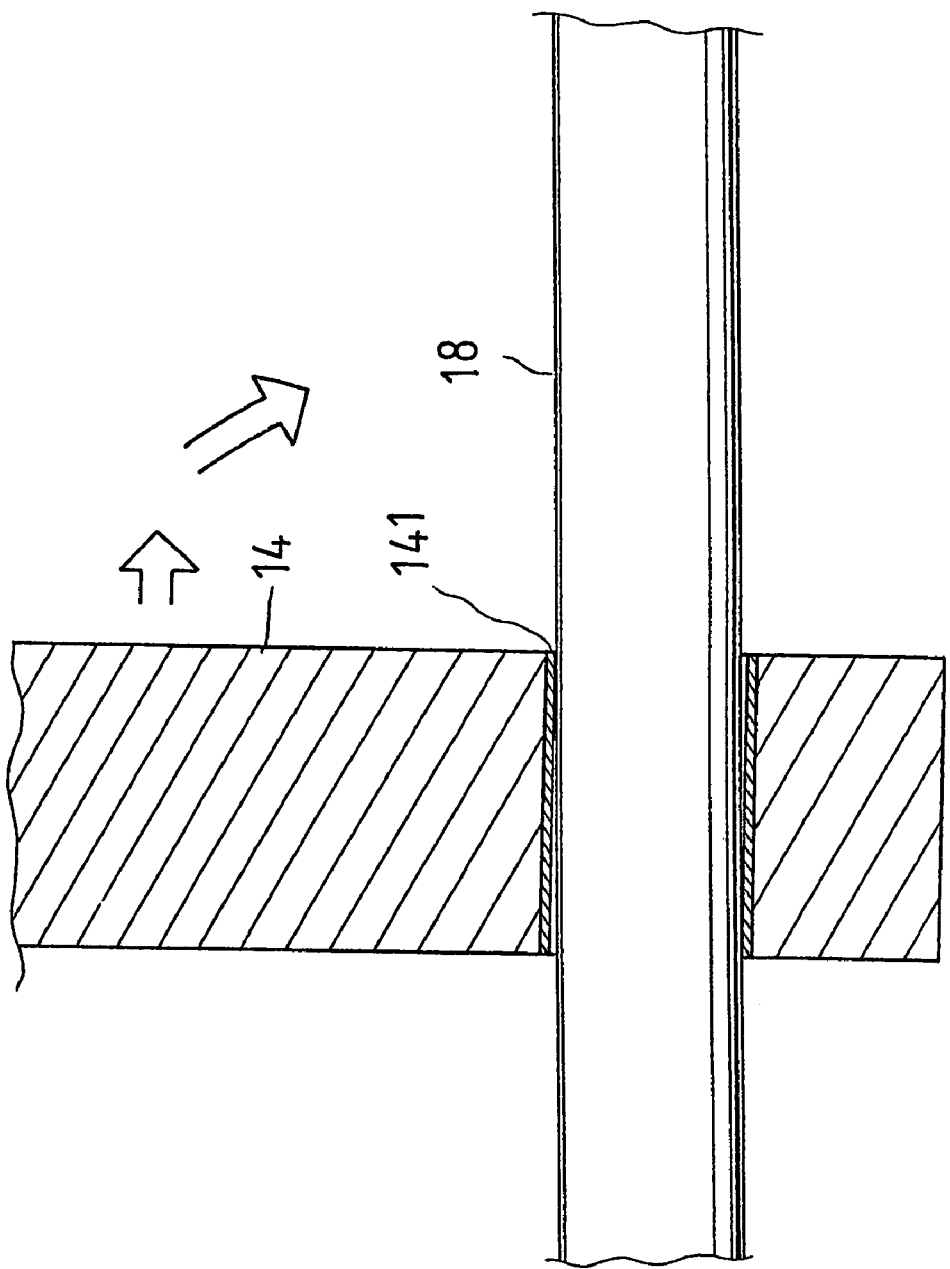
FIG. 2 is a view showing the relation between the guide rod and the bushing of the movable wall of the conventional molding machine.
Figure 3:
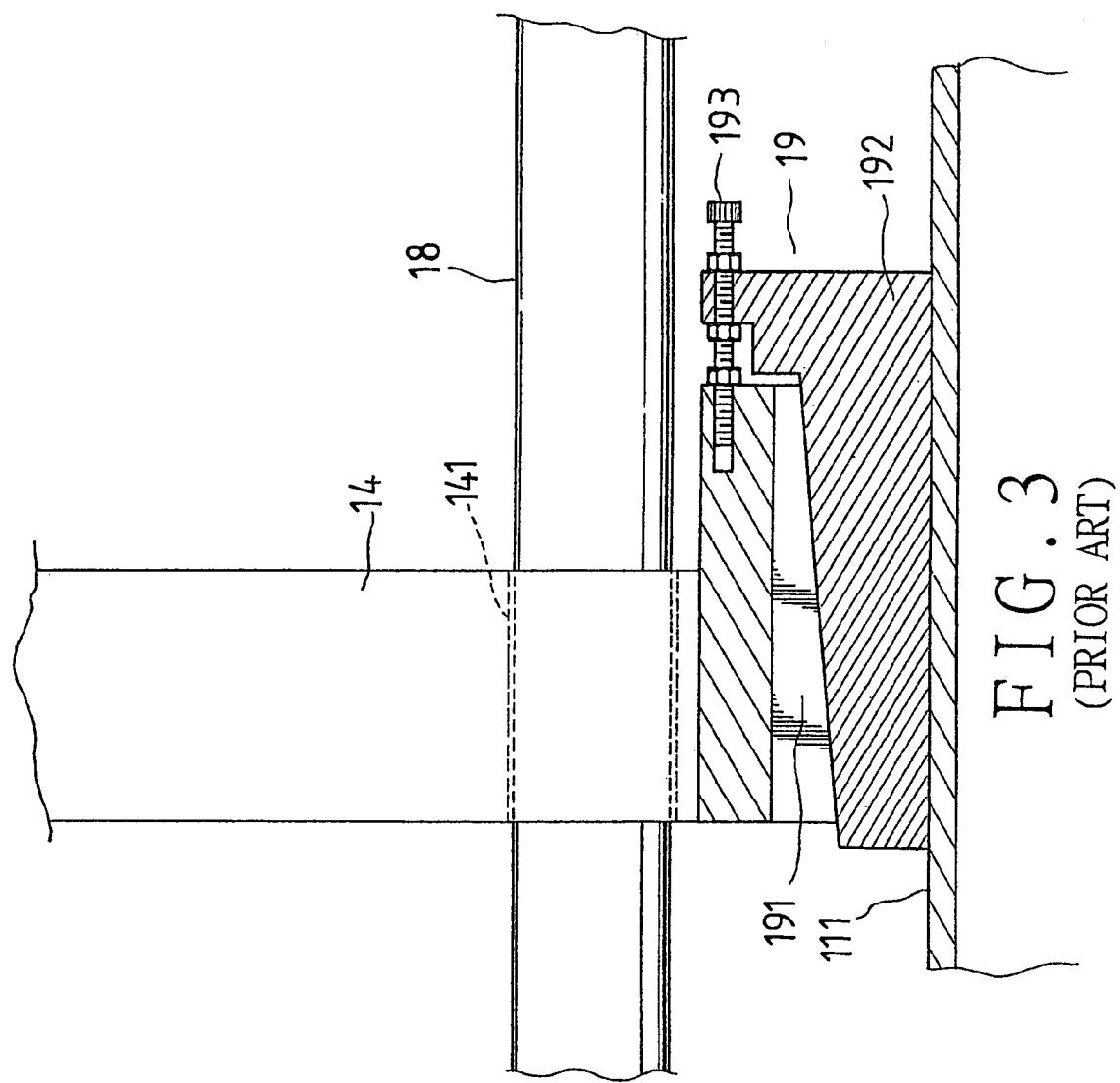
FIG. 3 is a sectional view of the conventional adjustment device.
Figure 4:
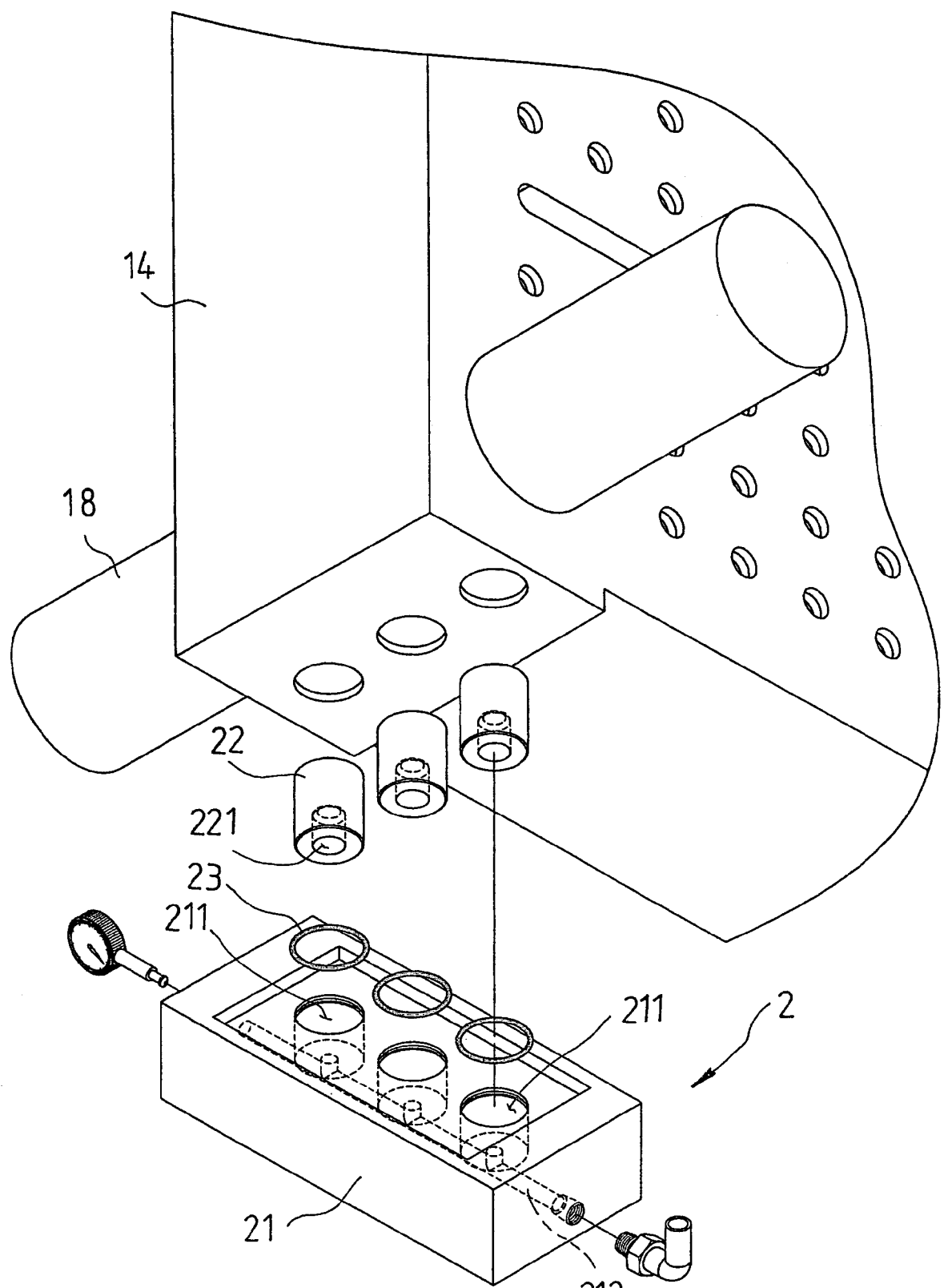
FIG. 4 is an exploded perspective view of the adjustment device according to the present invention.
Figure 5:
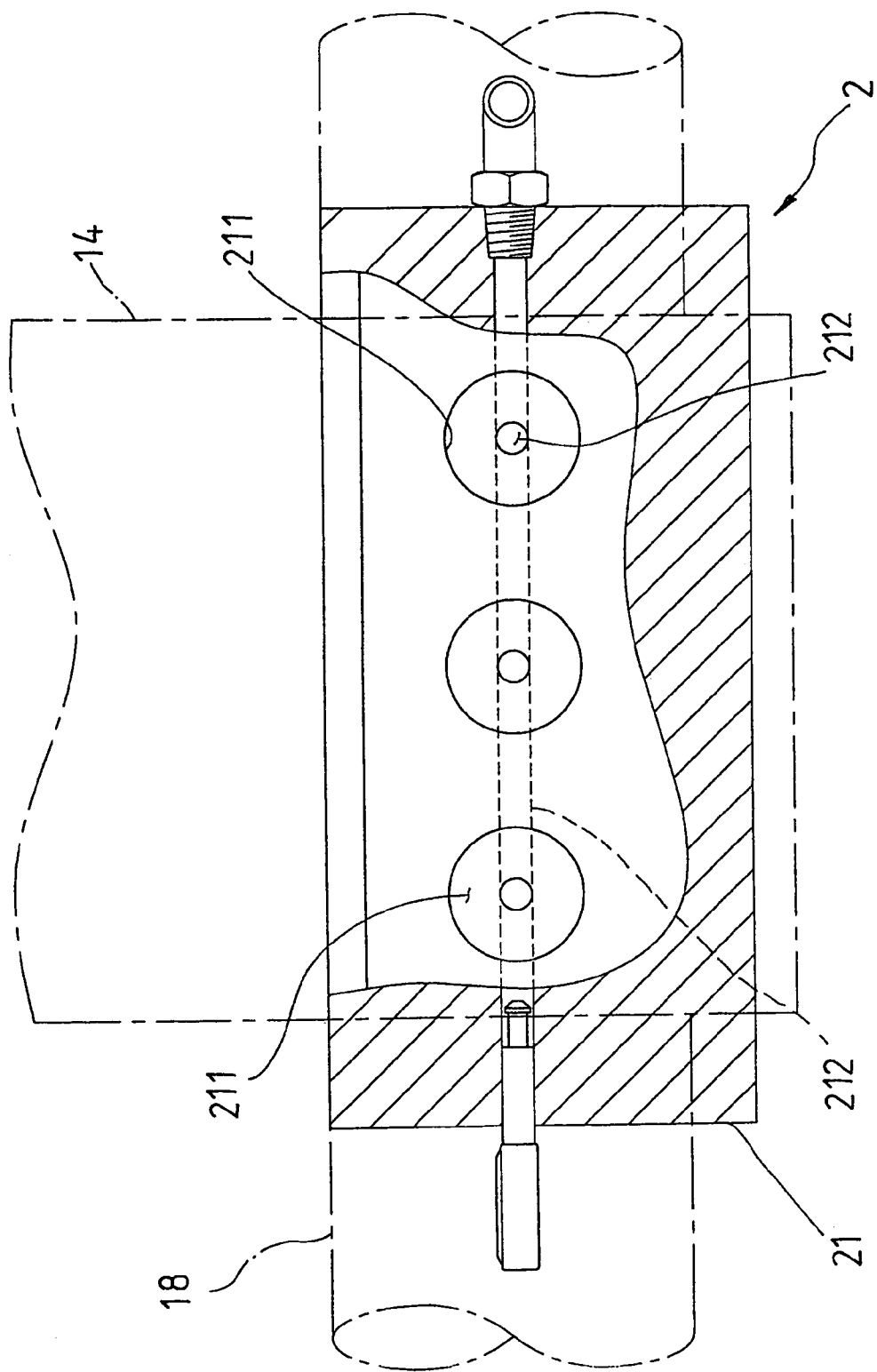
FIG. 5 is a horizontal sectional view of the present invention.
Figure 6:
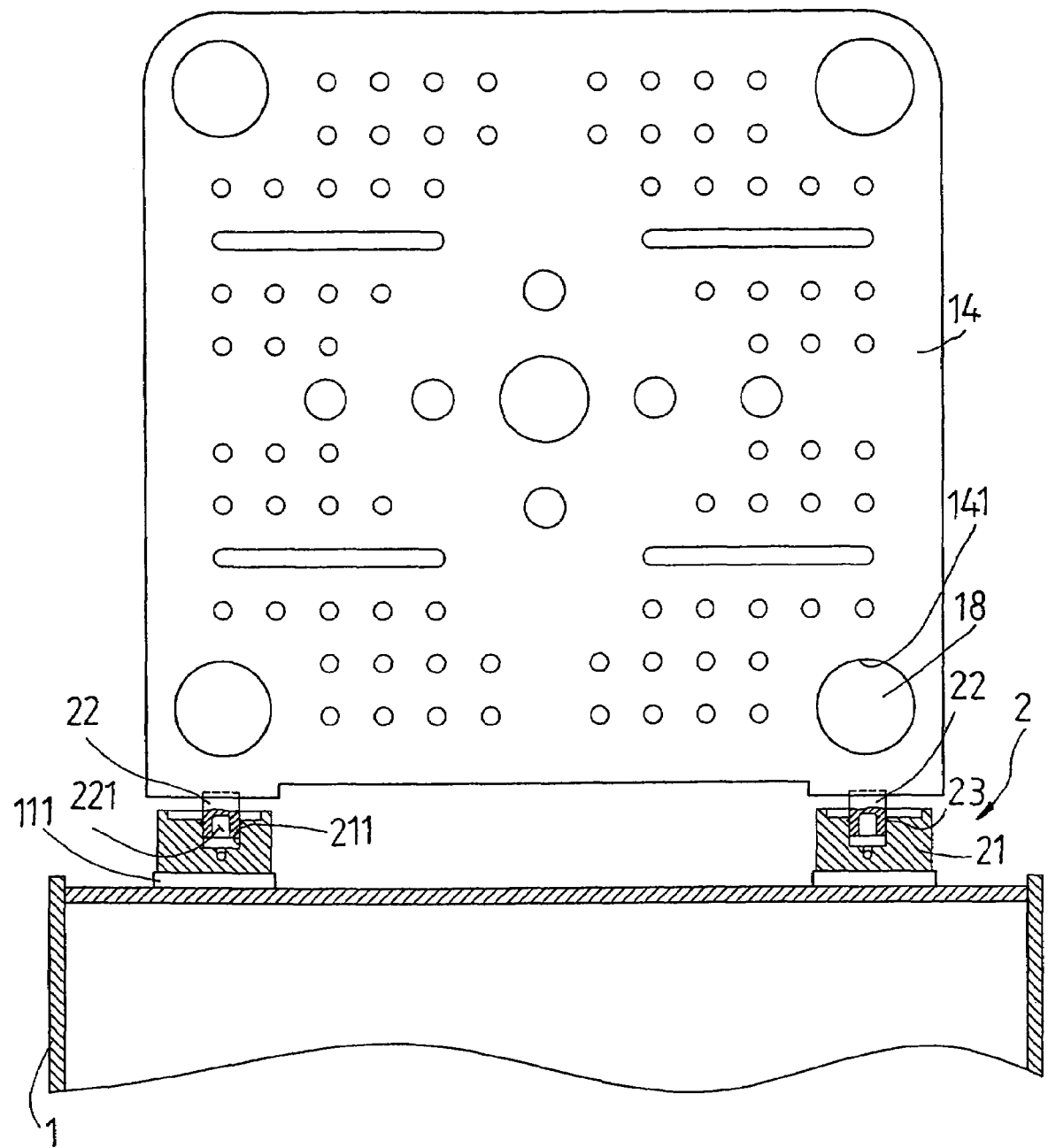
FIG. 6 is a lateral sectional view of the present invention.
Figure 7:
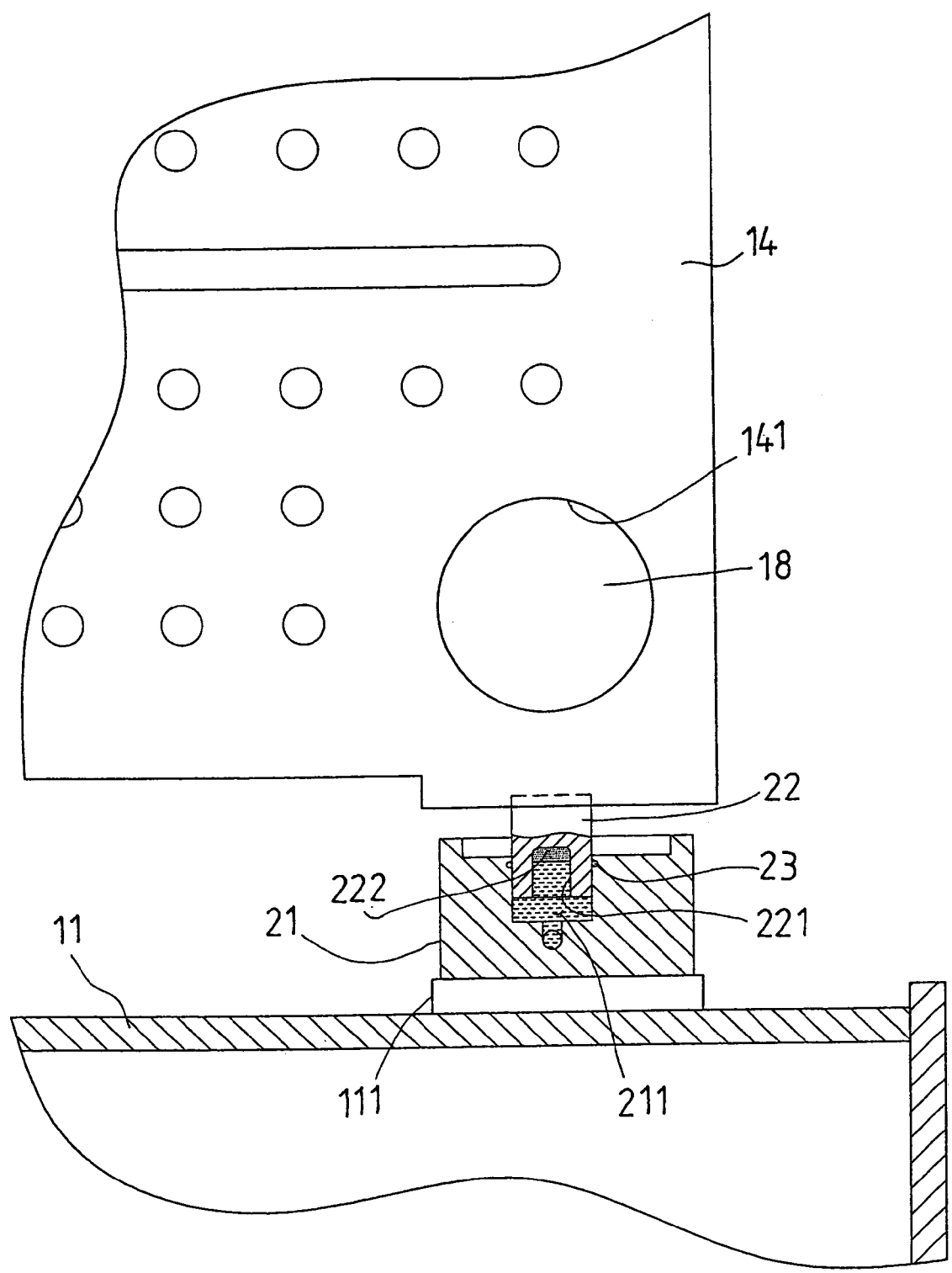
FIG. 7 is a view showing the condition of the adjustment device of the present invention is use (1)
Figure 8:
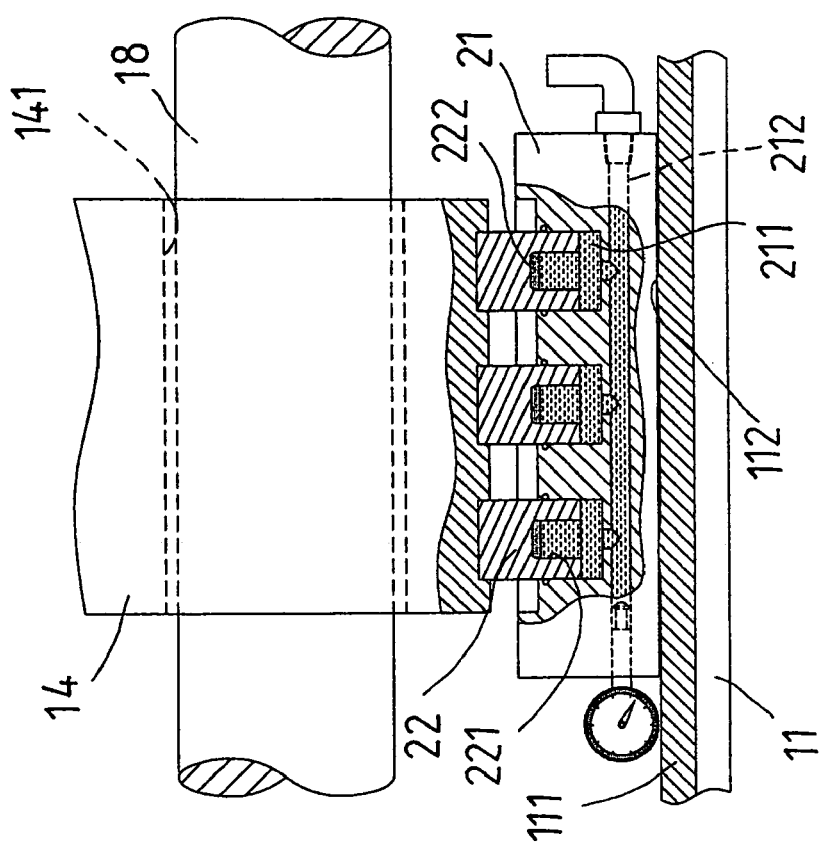
FIG. 8, is a view showing the condition of the adjustment device of the present invention is use (2)
Figure 9:
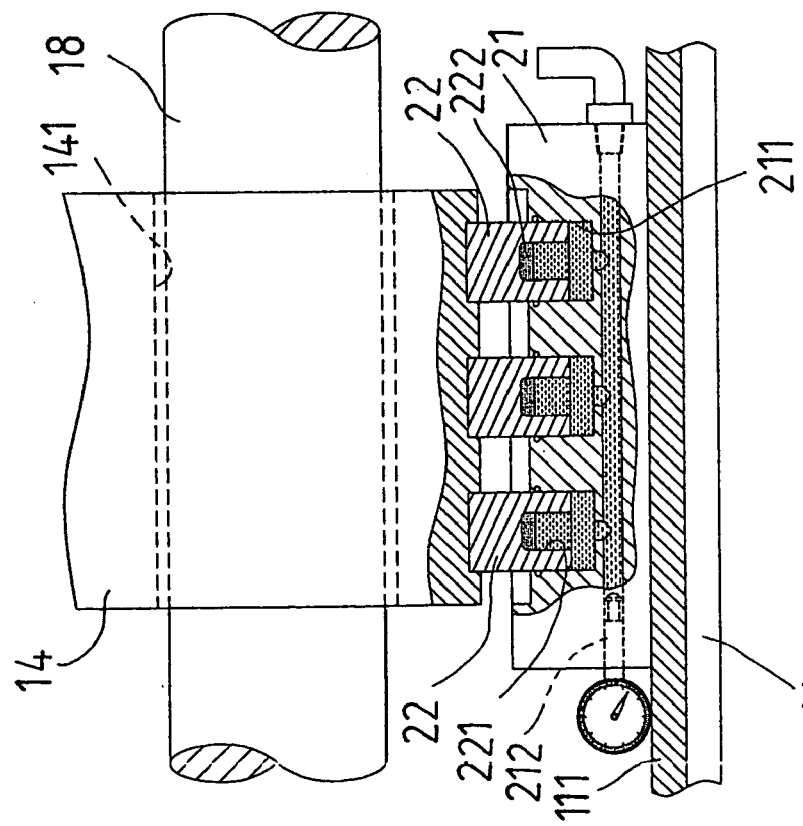
FIG. 9 is a view showing the condition of the adjustment device of the present invention is use (3)

Referring to FIGS. 4 to 6, a first preferred embodiment of an adjustment device 2 for a movable wall of an injection molding machine is provided. The adjustment device 2 is connected to a bottom of a movable wall 14 of the injection molding machine. The movable wall 14 is supported by and movable along guide rods 18 of the molding machine, and it has bushings 141 around the guide rods 18.

The adjustment device 2 includes a sliding base 21, several supporting posts 22, and oil seals 23. The sliding base 21 is formed with several cavities 211 on an upper side thereof, and an oil passage 212, which communicates with the cavities 211. The oil seals 23 are secured around respective ones of upper ends of the cavities 211 of the sliding base 21. Each of the supporting posts 22 has a holding room 221 on a lower end thereof. The supporting posts 22 are inserted in respective ones of the cavities 211 of the sliding base 21. The adjustment device 2 is positioned between both the movable wall 14 and a bed 11 of the molding machine with the sliding base 21 being supported on and movable along a guide rail 111 secured on the bed 11, and with the supporting posts 22 being connected to the bottom of the movable wall 14; therefore, the adjustment device 2 and the movable wall 14 will move along the guide rail 111 in the same direction and speed. And, hydraulic oil is injected into the sliding base 21 through the oil passage 212 until the supporting posts 22 prop up the movable wall 14 such that the axes of each bushing 141 and the corresponding guide rod 18 are completely aligned with each other; upper end portions of the holding rooms 221 of the supporting posts 22 will become air-containing rooms 222, which are full of air.

Therefore, when the sliding base 21 of the adjustment device 2 is moving on unsmooth portions of the guide rail 111 of the bed 11 during the course of to-and-fro movement of the movable wall 14, the adjustment device 2 will prevent possible vibration thereof from being passed on to the movable wall 2, with air being further compressed in the air-containing rooms 222 of the supporting posts 22. Consequently, the movable wall 14 is prevented from moving up and down, and the alignment of the axes of each bushing 141 and the corresponding guide rod 18 is maintained.

Figure 10:
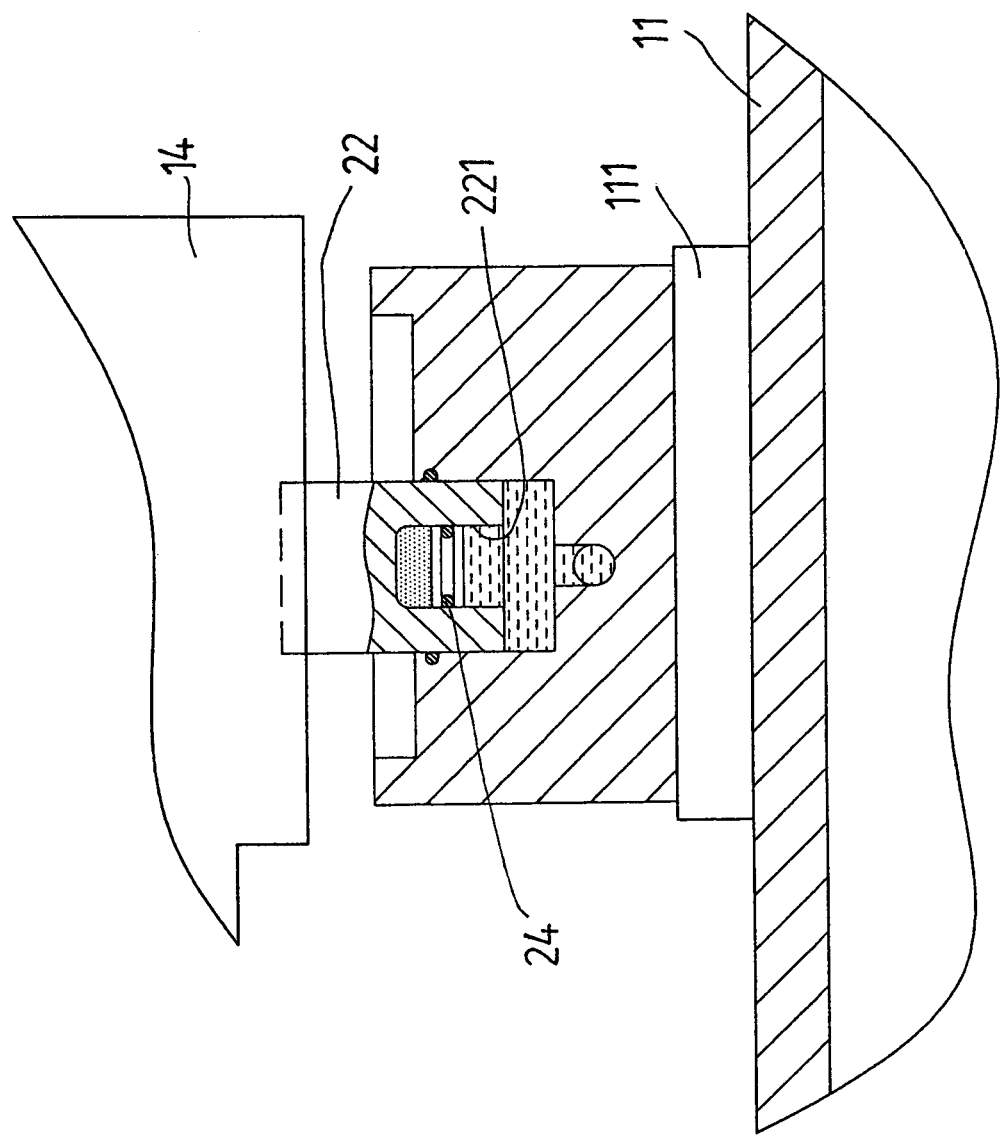
FIG. 10 is a section of the second preferred embodiment.

Referring to FIG. 10, the adjustment device 2 is further equipped with pistons 24, which are held in respective ones of the holding rooms 221 so as to closely touch the inner sides of the supporting posts 22. Therefore, when hydraulic oil is injected into the sliding base 21 as well as the supporting posts 22 through the oil passage 212, the pistons 24 will be pushed upwards along the holding rooms 221, causing compression of air contained in the space between the pistons 24 and the upper ends of the holding rooms 221 of the supporting posts 22. And, air will be uniformly distributed in the upper end portions of the holding rooms 221 because the pistons 24 and the supporting posts 22 are solid. Consequently, the movable wall 14 will move along the guide rods 18 even more smoothly.

Figure 11:
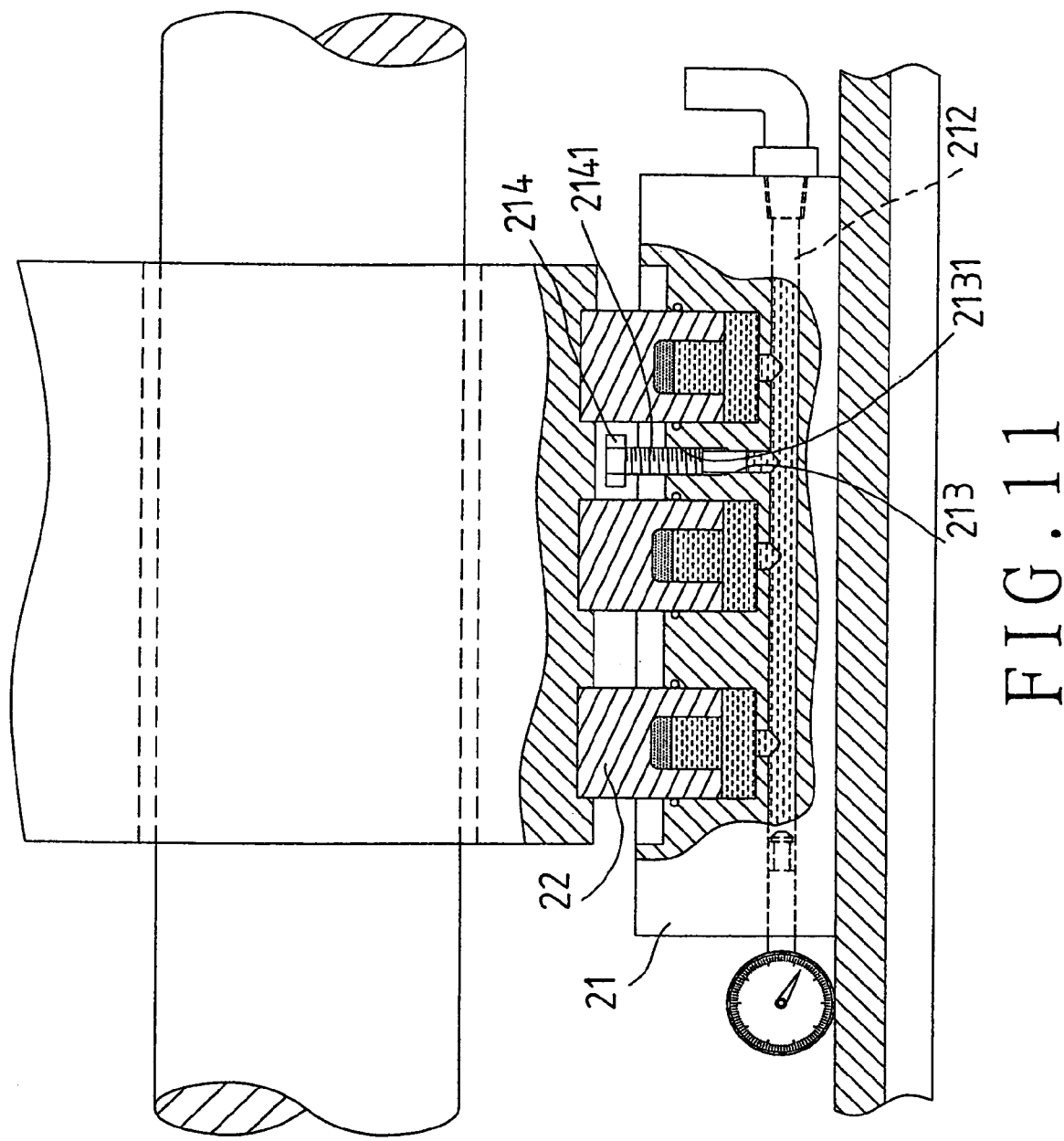
FIG. 11 is a section of the third preferred embodiment.

Referring to FIG. 11, the sliding base 21 is further formed with a hole 213, which communicates with the oil passage 212, and has female screw threads 2131 in an upper section thereof. And, a rod part 214, which has male screw threads 2141 on an upper section thereof, is passed through and threadedly engaged with the hole 213 of the sliding base 21. Therefore, when the hydraulic pressure in the adjustment device 2 becomes insufficient after the adjustment device 2 has been used for a long time, the user is allowed to increase the hydraulic pressure by means of displacing the rod part 214 in relation to the hole 213 of the sliding base 21 so as to pressurize the hydraulic oil.

From the above description, it can be easily seen that the adjustment device of the present invention has an advantage over the conventional one because it will maintain the alignment of the axes of each bushing of the movable wall and the corresponding guide rod not only when the movable wall is still, but also when the sliding base is moving on unsmooth portions of the guide rail of the bed during the course of to-and-fro movement of the movable wall, thus preventing the bushings from touching the guide rods in an abnormal manner to wear down too rapidly.

What is claimed is:

1. An adjustment device for a movable wall of an injection molding machine, comprising
    a sliding base; the sliding base being formed with a plurality of cavities on an upper side thereof; the sliding base being formed with an oil passage communicating with the cavities; the sliding base having oil seals secured around respective ones of the cavities thereof; the sliding base being supported on and movable along a guide rail secured on a bed of an injection molding machine;
    a plurality of supporting posts; each of the supporting posts having a holding room on a lower end thereof; the supporting posts being inserted in respective ones of the cavities of the sliding base such that the holding rooms communicate with the cavities; the supporting posts touching a bottom of a movable wall of the injection molding machine at upper ends thereof so as to prop the movable wall; the movable wall being supported by and movable along plural guide rods of the injection molding machine; the movable wall having bushings, which are around respective ones of the guide rods; and
    hydraulic oil; the hydraulic oil being injected into the sliding base and the holding rooms of the supporting posts through the oil passage until axes of each bushing and a corresponding guide rod are aligned with each other, with upper end portions of the holding rooms of the supporting posts becoming air-containing rooms full of air;
    whereby alignment of the axes of each bushing and the corresponding guide rod will be maintained when the movable wall is moving as well as when the movable wall is still.

2. The adjustment device for a movable wall of an injection molding machine as claimed in claim 1 being further equipped with pistons, which are held in respective ones of the holding rooms of the supporting posts so as to closely touch inner sides of the supporting posts, such that air will be contained and uniformly distributed in space between the pistons and upper ends of the holding rooms of the supporting posts to increase smoothness of movement of the movable wall.

3. The adjustment device for a movable wall of an injection molding machine as claimed in claim 1, wherein the sliding base is formed with a hole, which communicates with the oil passage, and which has female screw threads in an upper section thereof while a rod part, which has male screw threads on an upper section thereof, is passed through and threadedly engaged with the hole of the sliding base; thus, hydraulic pressure in the adjustment device can be adjusted by means of displacing the rod part in relation to the hole of the sliding base.

* * * * *